(12) United States Patent
Patterson et al.

(10) Patent No.: US 8,898,587 B2
(45) Date of Patent: Nov. 25, 2014

(54) ELECTRONIC BOOK INSCRIPTION SYSTEM

(71) Applicant: Google Inc., Mountain View, CA (US)

(72) Inventors: Anna Lynn Patterson, San Jose, CA (US); Scott Dougall, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 141 days.

(21) Appl. No.: 13/794,663

(22) Filed: Mar. 11, 2013

(65) Prior Publication Data

US 2014/0258912 A1    Sep. 11, 2014

(51) Int. Cl.
*G06F 3/048* (2013.01)
*G06F 3/0483* (2013.01)

(52) U.S. Cl.
CPC .................................... *G06F 3/0483* (2013.01)
USPC .......................................... 715/780; 715/230

(58) Field of Classification Search
USPC .......................... 715/230, 231, 232, 233, 780
See application file for complete search history.

(56) References Cited

U.S. PATENT DOCUMENTS

| | | | |
|---|---|---|---|
| 7,584,429 B2 | 9/2009 | Fabritius | |
| 8,352,449 B1 | 1/2013 | Parekh et al. | |
| 2008/0166049 A1 | 7/2008 | Wang et al. | |
| 2011/0050593 A1 | 3/2011 | Kim et al. | |
| 2012/0066581 A1* | 3/2012 | Spalink | 715/232 |
| 2012/0210269 A1 | 8/2012 | Yonemoto | |
| 2012/0284348 A1 | 11/2012 | Rothschild | |
| 2013/0254284 A1* | 9/2013 | Dougherty et al. | 709/204 |
| 2013/0318465 A1* | 11/2013 | Cheng et al. | 715/776 |
| 2014/0089775 A1* | 3/2014 | Worsley et al. | 715/230 |

FOREIGN PATENT DOCUMENTS

| | | |
|---|---|---|
| KR | 10-2008-0098221 A | 11/2008 |
| KR | 10-2012-0052053 A | 5/2012 |

OTHER PUBLICATIONS

PCT International Search Report and Written Opinion for PCT/US2014/011463, Jan. 14, 2014, 9 Pages.
Autograph LLC, webpage for www.Autography.com—Key Features, 2 pages, [online] [retrieved on Aug. 20, 2013] Retrieved from the internet <URL: http://www.autography.com/index.php/key_features>.
Book by You, webpage for www.bookbyyou.com, 1999, 2013, 2 pages, [online] [retrieved on Aug. 19, 2013] Retrieved from the internet <URL: http://bookbyyou.com/general/bbyteam.asp>.
Bookiejar, Inc., webpage for www.Bookiejar.com, 3 pages, [online] [retrieved on Aug. 19, 2013] Retrieved from the internet <URL:http://www.bookiejar.com/>.
Name in a Song, LLC, webpage for www.nameinasong.com, 2008, 1 page, [online] [retrieved on Aug. 19, 2013] Retrieved from the internet <URL:http://www.shop.nameinasong.com/aboutus.sc>.
U Star Novels, webpage for www.ustarnovels.com, 2013, 2 pages, [online] [retrieved on Aug. 19, 2013] Retrieved from the internet <URL:http://www.ustarnovels.com/default.aspx>.
Webpage for www.kidscustomstorybooks.com—About, 1 page [online] [retrieved on Aug. 19, 2013] Retrieved from the internet <URL:http://www.kidscustomstorybooks.com/about.html>.

* cited by examiner

*Primary Examiner* — Thanh Vu
(74) *Attorney, Agent, or Firm* — Fenwick & West LLP (57) ABSTRACT

A portion of an electronic book is displayed and a selection of a position within the portion is received. The content of the electronic book is analyzed to determine an amount of whitespace that corresponds to the selected position. In response to the determined amount of whitespace being greater than a threshold amount, a user interface for providing inscription data is displayed. Inscription data is received and stored in association with an indication of the selected position.

24 Claims, 5 Drawing Sheets

ELECTRONIC BOOK INSCRIPTION SYSTEM

BACKGROUND

1. Technical Field

The invention generally relates to the field of electronic books and, more particularly, to systems and methods for adding custom inscriptions to electronic books.

2. Background Information

Electronic books ("ebooks") have become increasingly popular in recent years. Ebooks now account for over 20% of all book sales in the United States, and that percentage is rising rapidly. Some estimates have the ebook market share reaching 50% as early as 2016. Electronic books can be displayed on dedicated electronic book reading devices and electronic book reading applications are available for many electronic devices such as smart phones and tablets, devices that many people already carry every day. With a single electronic device, a user can access millions of books, making the reading experience far more convenient and accessible.

However, for a variety of reasons, some people prefer traditional hard-copy books to their electronic counterparts. One such reason is the additional value that many people place on copies of books that include an autograph or other inscription made by the author. Although some systems exist for adding additional content to ebooks, these systems tend to be unwieldy and do not allow authors and readers the same flexibility as they enjoy when signing a hard-copy of a book. Technology provides as yet unrealized opportunities to provide and extend the ability for authors to inscribe copies of their books.

SUMMARY OF THE INVENTION

A method for inscribing an electronic book ("ebook") includes displaying a portion of the electronic book on the display of a local computing device, such as an ereader. A selection of a position within the displayed portion is received and a user interface for providing inscription data is displayed responsive to a determination that the selected position corresponds to greater than a threshold amount of whitespace. The inscription data is received responsive to user input and stored in association with an indication of the selected position. In one aspect, storing the inscription data comprises transmitting the inscription data to a remote computing device. In a second aspect, the inscription data includes at least one of: typed text, freehand text, an image, a video, or an audio recording.

In another aspect, the method further includes analyzing the content of the ebook at the selected position to determine an amount of whitespace. The selected position is determined to correspond to greater than the threshold amount of whitespace responsive to the determined amount of whitespace being greater than the threshold amount.

In a related aspect, analyzing the content of the ebook includes determining the largest rectangle encompassing the selected position that can be placed without encompassing any non-whitespace ebook content and calculating the area of the rectangle. The determined amount of whitespace being the calculated area of the rectangle.

In a further aspect, storing the inscription data comprises transmitting the inscription data to a plurality of remote computing devices that are connected to the local computing device using an online chat interface.

In a yet further aspect, receiving the selection of the position includes receiving data describing user input. Data indicating that a user is pressing and holding at a point of contact of the display is identified in the received data, with the point of contact corresponding to the selected position.

In yet another aspect, the method further comprises identifying a second ebook that is related to the ebook. An area in the second ebook that contains greater than the threshold amount of whitespace is identified and an indication of a position corresponding to the area is stored in association with the inscription data.

A non-transitory computer readable storage medium containing storing executable computer program instructions for performing the method and a system for performing the method are also disclosed.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Electronic Book System Overview

Figure 1:
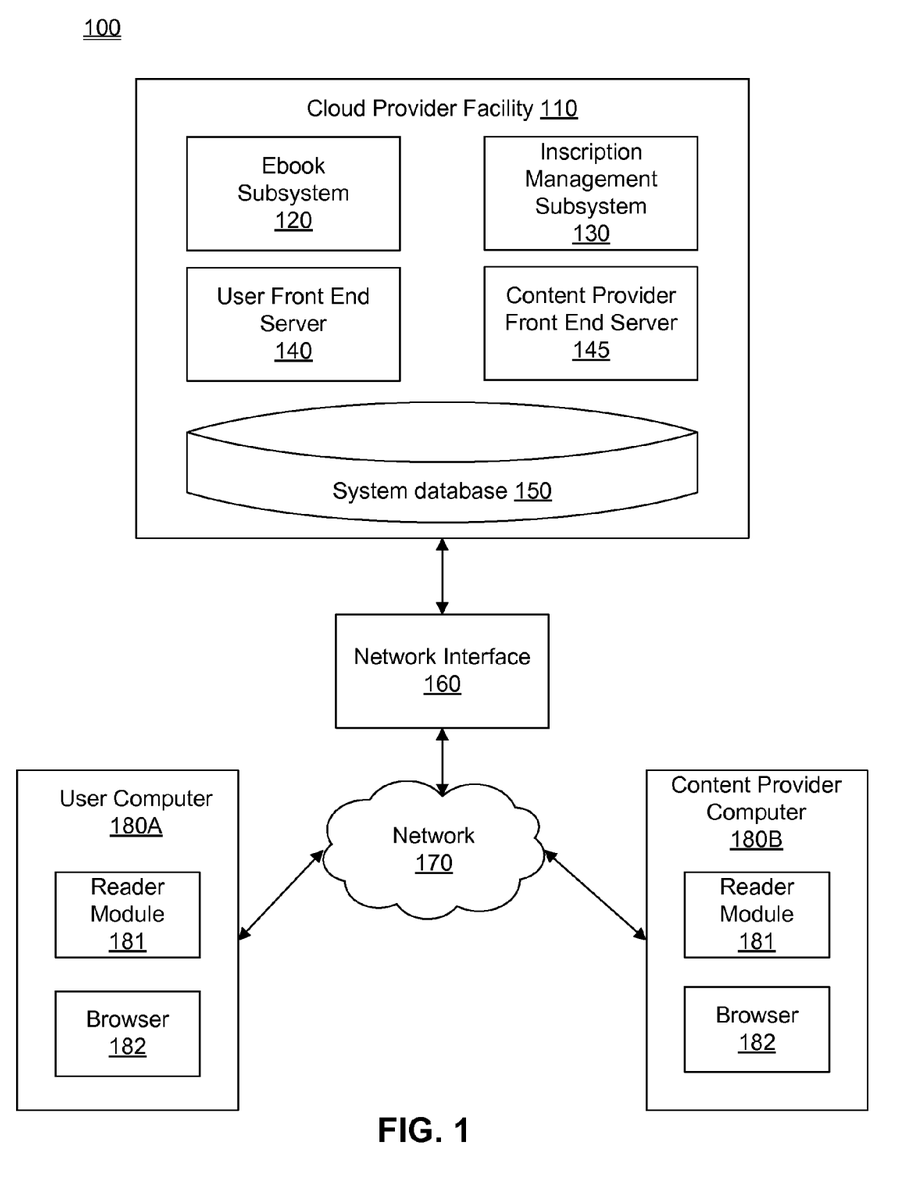
FIG. 1 is a high-level diagram illustrating a networked computing environment suitable for providing custom inscriptions in ebooks, according to one embodiment.

FIG. 1 is a high-level diagram illustrating a networked environment 100 suitable for providing electronic books (ebooks) and associated inscriptions to users. In the embodiment shown, the networked environment 100 includes a cloud provider facility 110, a network interface 160, and computers 180 (depicted in FIG. 1, for exemplary purposes only, as individual computers 180A and 180B). A network 170 provides communication pathways between elements of the networked environment 100. The network 170 is typically the Internet, but can be any network, including but not limited to any combination of a LAN, a MAN, a WAN, a mobile, a wired or wireless network, a private network, or a virtual private network. In other embodiments, the networked environment 100 contains different and/or additional elements. In addition, the functions may be distributed among the components in a different manner than described herein.

The network interface 160 manages network communications to and from the cloud provider facility 110. In one embodiment, the network interface performs a load balancing role by routing incoming communications to one of a plurality of servers of the cloud provider facility 110 based on the amount of computational work being performed by each of the plurality of computing devices.

As discussed above, only a single user computer 180A is shown, but in practice there are many (e.g., millions of) user computers 180A that can communicate with and make use of the functionality provided by the cloud provided facility 110. User computers 180A are typically ereader devices, but can be any computing devices capable of displaying an ebook, including desktop PCs, laptops, tablets, and smartphones. Similarly, only a single content provider computer 180B is shown, but in practice there are many (e.g., thousands or even millions of) content provider computers. Content provider computers 180B enable content providers (e.g., authors, publishers, etc.) to provide books and related materials to the cloud provider facility 110, thus making the books and related materials available to the user computers 180A. Content provider computers 180B are typically desktop PCs, but can be any computing devices capable of providing books and related content, including laptops, tablets, ereaders, and smartphones. In some embodiments, reader module 181 and/or browser 182 include a content player (e.g., FLASH™ from Adobe Systems, Inc.), or any other player adapted for presenting content in file formats used by the cloud provider facility 110. Exemplary embodiments of the reader module 181 are described in greater detail below, with reference to FIG. 2.

User computer 180A with reader module 181 is used by users to purchase or otherwise obtain, and access, electronic books and related material (e.g., inscriptions) provided by the ebook subsystem 120 of the cloud provider facility 110. Content provider computer 180B is used by content providers to create and provide material for the content hosting system 110. A given computer can be both a client computer 180A and content provider computer 180B, depending on its usage. The cloud provider facility 110 may differentiate between content providers and users in this instance based on which front end server 140, 145 is used to connect to the cloud provider facility 110, user logon information, or other factors.

In the embodiment shown in FIG. 1, the cloud provider facility 110 comprises a user front end server 140 and a content provider front end server 145 each of which can be implemented as one or more server class computers. The cloud provider facility further comprises a system database 150, an ebook subsystem 120, and an inscription management subsystem 130. Other embodiments of the cloud provider facility 110 may include different and/or additional components. In addition, the functions provided may be distributed among the components in a different manner than described herein.

The content provider front end server 145 is connected through the network 170 (and network interface 160) to content provider computer 180B. The content provider front end server 145 provides an interface for content providers to log in to the cloud provider facility 110 and access the functionality it provides for content providers, e.g., creating and managing materials the content provider would like to make available to users. The user front end server 140 is connected through the network 170 (and network interface 160) to user computer 180A. The user front end server 140 provides an interface for users to log in to the cloud provider facility 110 and access the functionality it provides for users, e.g., to download or view material created by content providers.

The system database 150 stores electronic books and related materials along with user and system usage information. The system database 150 can be implemented as any device or combination of devices capable of persistently storing data in computer readable storage media, such as a hard disk drive, RAM, a writable compact disk (CD) or DVD, a solid-state memory device, or other optical/magnetic storage mediums. Other types of computer-readable storage mediums can be used, and it is expected that as new storage mediums are developed in the future, they can be configured in accordance with the descriptions set forth above. The data stored in system database 150 is described in further detail below, with reference to FIG. 3.

The ebook subsystem 130 maintains a catalog of electronic books available to users. When a user logs in (e.g., by providing a username and password) the ebook susbsystem 120 enables the user to access ebooks the user already has access permission for as well as obtain access permission to additional ebooks (e.g., by purchasing one or more ebooks). In one embodiment, an ebook is downloaded in its entirety to the user computer 180A upon the user gaining access permission; in another embodiment the ebook is streamed to the user only as needed. Numerous commercial systems exist that enable users to obtain ebooks and other materials, such as the GOOGLE PLAY EBOOKSTORE™ provided by GOOGLE INC.

The inscription management subsystem 130 manages inscriptions associated with users and content providers. In the embodiment shown, a single inscription management subsystem manages inscriptions for both users and content providers. A user with respect to one ebook may be a content provider with respect to another ebook. For example, the inscription management subsystem could consider J. K. Rowling to be a content provider when accessing *Harry Potter and the Deathly Hallows* but a user when accessing *A Wizard of Earthsea*. In other embodiments, inscription management functionality for content providers and users is provided by distinct subsystems (not shown). The inscription management subsystem 130 is described in greater detail below, with reference to FIG. 4.

In one embodiment, the cloud provider facility 110 is implemented by a network of server class computers that can include one or more high-performance CPUs and 1 G or more of main memory, as well as 500 GB to 2 Tb of storage. An operating system such as LINUX is typically used. The operations of the cloud provider facility 110 and front end servers 140, 145 as described herein can be controlled through either hardware (e.g., dedicated computing devices or daughter-boards in general purpose computers), or through computer programs installed in computer storage on the servers of the cloud provider facility 110 and executed by the processors of such servers to perform the functions described herein. One of skill in the art of system engineering and, for example, electronic content distribution, will readily determine from the functional and algorithmic descriptions herein the construction and operation of such computer programs.

The following sections describe in greater detail the reader module 181, system database 150, inscription management subsystem 130, and other components illustrated in FIG. 1 in greater detail, and explain their operation in the context of the creating and managing ebook inscriptions.

Reader Module

Figure 2:
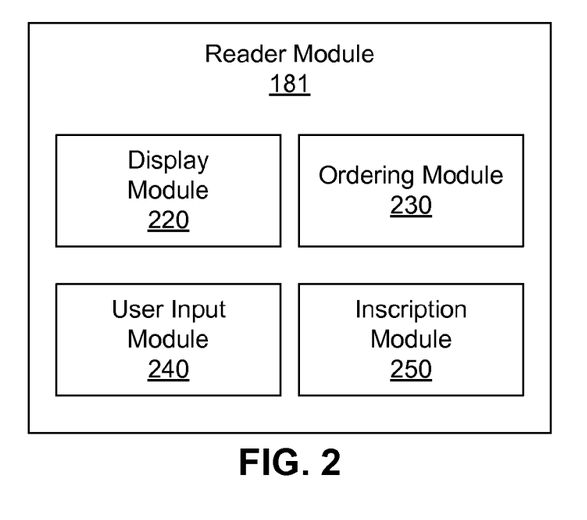
FIG. 2 illustrates a logical view of the reader modules shown in FIG. 1, according to one embodiment.

FIG. 2 illustrates a logical view of the reader modules 181 shown in FIG. 1. In the embodiment shown, the reader module 181 is implemented on computers 180, but it should be recognized that in other embodiments, portions discussed herein could also be implemented by other devices (e.g., by servers of the cloud provider facility 110) that are in communication with the reader module 181. It should also be recognized that while in the embodiment shown the reader modules 181 of user computer 180A and content provider computer 180B are identical, in other embodiments distinct versions of the reader module exist for user computers and content provider computers that provide functionality tailored to that device. For example, the reader module 181 of a user computer 180A may enable real-time signing of a displayed book while the reader module of a content provider computer may provide an interface for an author to create an inscription and make it available for download and/or send it to specified users.

In the embodiment illustrated in FIG. 2, reader module 181 includes display module 220, an ordering module 230, a user input module 240, and an inscription module 250. Other embodiments of the reader module 181 include different and/or additional modules. In addition, the functions may be distributed among the modules in a different manner than described herein. For example, in some embodiments, the reader module 181 may access only preloaded ebooks and not include an ordering module 230.

The display module 220 receives at least part of an ebook and presents it to the user. In one embodiment, the user has pre-downloaded the ebook from the cloud provider facility 110 (e.g., by purchasing the ebook from the GOOGLE PLAY EBOOKSTORE™) and the display module 220 accesses the ebook from local data storage (not shown). In another embodiment, the display module 220 directly accesses a remote copy of the ebook stored in the system database 150, via the network 170. The display module 220 can present the ebook to the user on a screen, as audio playback (an audio book), and/or in any other appropriate manner.

The ordering module 230 provides a user interface that enables users to obtain ebooks and related materials. In one embodiment, ordering module 230 is implemented as an interface with an electronic marketplace provided by the ebook subsystem 120 (e.g., the GOOGLE PLAY EBOOKSTORE™). The user browses for ebooks in the marketplace and selects one or more for which access permission is desired. Different ebooks can have different access permission policies. For example some ebooks may require the user to purchase them, others may be free, while yet others may be available to rent for a limited time. As described previously, on obtaining access permission for a particular ebook, the ebook may either be downloaded to the user computer 180A or streamed as needed via the network '170. In some embodiments, the ordering subsystem also enables users to obtain additional materials related to an ebook (e.g., inscriptions, background information, supplementary illustrations, and the like). As with the ebooks themselves, these additional materials may be subject to different access permission policies and, once access permission has been obtained, may be downloaded or accessed directly from the cloud provider facility 110.

The user input module 240 provides user interface tools to facilitate the use of ebooks and related features. For instance, by sensing particular gestures on a touch screen of user computer 180A, the system shifts display of an ebook from a current page to a new section. By sensing another user input, the user input module 240 determines that the user desires to interact with an identified portion of the ebook. The user input module 240 recognizes text input from the user, either from a physical keyboard or via an on-screen keyboard. In one embodiment, the user input module 240 also recognizes freehand input (e.g., an author's signature) input via a touchscreen, drawing tablet, or the like.

The inscription module 250 identifies specified user input (as sensed by the user input module 240) as a request to add an inscription to an ebook. In one embodiment, the inscription module 250 receives an indication of a position in an ebook from the user input module 240. For example, the user input module 240 may detect the user pressing and holding on a touchscreen for a threshold amount of time (e.g., 500 milliseconds) and send an indication of the point of contact on the touchscreen (e.g., x/y pixel coordinates) to the inscription module 250. As another example, the user may identify a particular ebook, page, and position on that page by entering data (e.g., an ebook ID, page number, and line number) into a form displayed on the user computer 180A.

In response to receiving an indication of a position, the inscription module 250 determines whether the indicated position corresponds to an area of whitespace that is large enough to include an inscription. In some types of ebook (e.g., graphic novels) or types of pages (e.g., covers) an area of whitespace can be considered to be any area of substantially the same color, shading, and/or texture. For example, on a cover that includes a city skyline, an area of blue sky is considered to be whitespace and thus available as a potential site for adding an inscription. In some embodiments, certain types of content are allowed to be partially obscured. In such embodiments, an area of whitespace is considered to be the sum of the substantially empty portions of the page and one or more connected portions that do not overlap underlying ebook content by more than a preset amount. For example, when adding an inscription to the cover of an electronic copy of Rolling Stone magazine, the inscription module 250 may be configured to allow up to 25% of the magazine's title to be obscured. Thus, the available whitespace includes any areas containing the cover's background color plus adjoined areas that overlap with the title by no more than 25%.

In one embodiment, an area of whitespace is considered large enough if the inscription module 250 can place a rectilinear inscription object that encompasses the indicated position within it. The size of the rectilinear inscription object may be pre-set or it may be determined from user parameters. For example, a user options screen may include sliders indicating the minimum height and width of an inscription. In some embodiments, the amount of whitespace required is in part determined by the type of data that is to be included in the inscription. For example, if the reader has configured the inscription module 250 to add audio annotations to an ebook, the space required may be only that required to add a small icon showing a speaker to indicate that an audio inscription has been inserted at the indicated position. In embodiments where the ebook is presented to the reader audibly, the inscription module 250 considers whether there is an adequate amount of the audio equivalent of whitespace, e.g., a period of audio playback that is substantially silence.

In another embodiment, the inscription module 250 may search outwards from the indicated position to find the nearest non-whitespace in each direction (e.g., up, down, left, and right) and calculate the area of the largest rectilinear inscription object that could be placed without overlapping any of the non-whitespace. The calculated area (or individual dimensions) is then compared to a minimum size required for placing an inscription (whether pre-set or user selected). In other embodiments, different shapes of inscription object and/or different methods for determining whether the indicated position corresponds to a sufficient whitespace area are used.

If the indicated position corresponds to a sufficient amount of whitespace for an inscription, the inscription module 250 sends instructions to the display module 220 to provide a user interface for providing the inscription. The inscription can comprise one or more types of data, including searchable (e.g., typed) text, freehand text, freehand drawings, photographs, videos, audio recordings, and the like. For example, if a reader attends an in-store signing by an author, the reader may purchase an electronic copy of the author's new book and open it to a page including at least one area of whitespace that is sufficient to include an inscription. The reader then presses and holds in one of the areas of whitespace on the page to open the inscription interface and passes the book to the author who provides an inscription (e.g., by signing using a stylus). Further ways in which inscriptions can be added to ebooks are described below with reference to FIGS. 4 and 6.

If the indicated position received by the inscription module 250 does not correspond to a sufficient whitespace area, the inscription module provides the user with one or more options. In one embodiment, the inscription module 250 searches the ebook for the nearest area of whitespace that is large enough for an inscription to the indicated position and presents this option to the user with a prompt for confirmation that the user wishes to add an inscription at the suggested location. In other embodiments, the inscription module 250 determines the type of content that an inscription placed at the indicated location would overlap and provides a contextual menu with options based on the type of content. For example, if the inscription would overlay text, the contextual menu may include options to select the text, add an annotation to the text, and add a book mark at the indicated location. One example of such a contextual menu for annotating content corresponding to the indicated position is described in co-pending application Ser. No. 13/182,809, entitled Electronic Book Contextual Menu Systems and Methods, which is incorporated herein by reference in its entirety. In one such embodiment, the contextual menu includes an option to override the determination that the indicated position doesn't correspond to a sufficient amount of whitespace and add an inscription that overlays the underlying ebook content.

System Database

Figure 3:
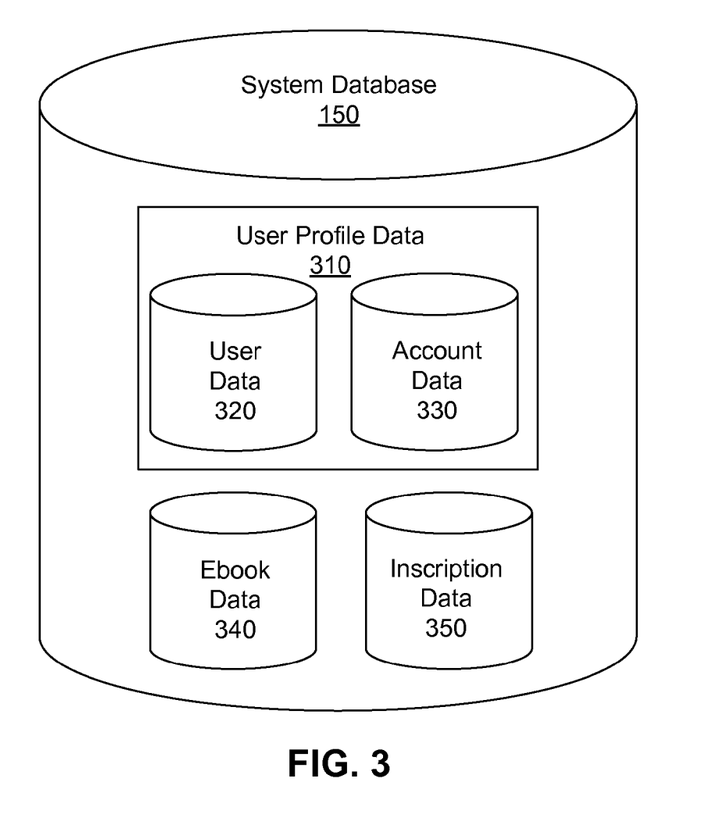
FIG. 3 illustrates a logical view of the data store of the cloud provider facility shown in FIG. 1, according to one embodiment.

FIG. 3 illustrates a functional view of the system database 150 that stores data related to the cloud provider facility 110 providing ebook inscription functionality. The system database 150 may be divided based on the different types of data stored within. This data may reside in separate physical devices, or it may be collected within a single physical device.

Ebook data 340 stores the ebooks that are provided to users upon their request. An ebook includes content and metadata. Ebook content includes an electronic collection of text (and possibly additional types of content such as images, video and/or sound). For example, ebook content includes content of a book such as would be printed on the pages of a traditional paper-based book. All of the text in the collection may be from a single source, or the collection may contain text from different sources. The text may have originated in a traditional paper-based format (e.g., a physical book or newspaper), or it may have originated in a digital format (e.g., electronic files in a format such as Portable Document Format (PDF), EPUB format, or flowing text format). The content of an ebook is divided into segments so that portions of the content can be transferred and/or loaded separately. For example, an ebook can include one segment for each chapter. In one embodiment, ebook content includes files that adhere to the HTML format, the Cascading Stylesheets (CSS) format, and various multimedia formats (e.g., audio files, image files, and video files).

Ebook metadata includes bibliographical information about an ebook, such as the title, author, publisher, publication date, number of pages, number of chapters, etc. Ebook metadata also includes a unique identifier for the ebook (e.g., an ebook ID number) and a list of segments into which the ebook's content is divided (e.g., chapters). In one embodiment, a segment is represented on the list of segments by an identifier that is unique within the particular book and may or may not be globally unique within the ebook data 340.

User profile data storage 310 includes information about an individual user 320 (e.g., a reader and/or author). The user data includes identifying information (e.g., a user ID and password) with which the cloud provider facility 110 (or a component thereof) can uniquely identify and verify the user's identity in order to provide personalized services. In one embodiment, the user data 320 includes data indicating which books from the book data 340 the user has permission to access. The user data 320 may also indicate which books (if any) the user is associated with as a content provider.

In some embodiments, the user data 320 also maintains information regarding where readers are in each of the their ebooks to allow, for example, a reader to read part of an ebook chapter on a smart phone while on a bus and continue reading from the same spot on the reader's desktop computer when at home.

User data 320 also contains, in some embodiments, data about the user that is not explicitly entered by the user, but which is obtained as the user navigates through ebooks and related materials. In one such embodiment, users are informed of the intent to gather such data and asked to opt-in to the data collection. The reader module 181 also provides user interface controls to enable users to opt-out of such data collection after previously opting-in, thereby giving users control over the information that is gathered and protecting their privacy.

Account data storage 330 keeps track of the user's payment mechanisms (e.g., Google Inc.'s CHECKOUT®) related to the user's ability to obtain content from the cloud provider facility 110.

The inscription data storage 350 contains data relating to inscriptions associated with ebooks. Inscriptions generally include the inscription content for display and inscription metadata describing the inscription. As described earlier, inscription content can include one or more types of data, such as searchable text, freehand text, freehand drawings, photographs, videos, audio recordings, and the like. For example, in one embodiment an inscription includes searchable text indicating the user who made the inscription (e.g., the name of the author of the ebook) and a freehand signature. In another embodiment, a photograph from an in-store signing showing the ebook's author and a fan together is added as an inscription along with searchable text describing the state and location of the signing. In yet another embodiment, a link to a video of the author talking about the book is added as an inscription along with a brief text description of the video. In further embodiments, other combinations of data types are added to ebooks as inscriptions.

Inscription metadata is used herein to describe any data within the network environment 100 that provides additional information related to one or more inscriptions. In one embodiment, the inscription metadata for each inscription includes an indication of a particular ebook (e.g., an ebook ID), a position within the particular ebook (e.g., a page number and x/y coordinates), and identifiers for one or more users that can view the inscription (e.g., a list of usernames). The inscription metadata may also include (but is not limited to): an indication of who created the inscription (e.g., the author's name), the physical location at which the inscription was created (e.g., a bookstore where an in-store signing occurred), the time at which the inscription was created (e.g., the date of an in-store signing), a time at which the inscription becomes viewable (e.g., the date of a specific promotion), conditions that must be met before the inscription becomes viewable (e.g., the user entering an unlock code or being selected as a contest winner).

Inscription Management

Figure 4:
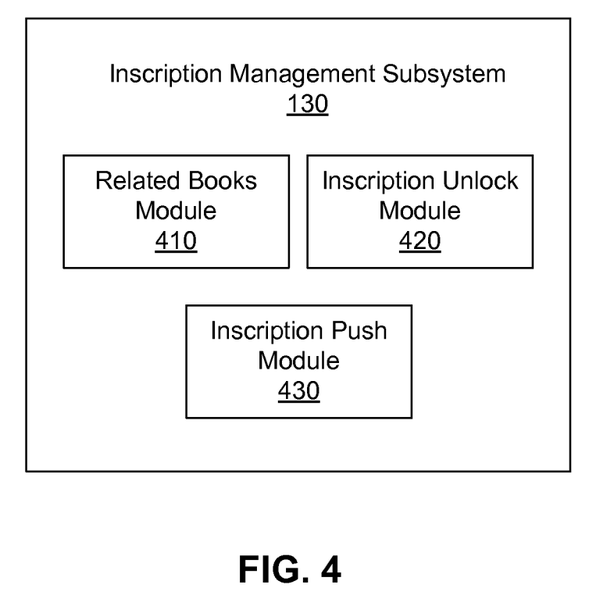
FIG. 4 illustrates a logical view of the inscription management subsystem of the cloud provider facility shown in FIG. 1, according to one embodiment.

The inscription management subsystem 130 provides various functions to enable users and content providers to manage the use and distribution of inscriptions. Users typically desire to be able to manipulate and access content once they have obtained it to be displayed and used in different ways. For example, a user with a signed copy of an ebook stored on a tablet device may wish the signature to also be displayed in a copy of the ebook stored on the user's home computer. Content providers will typically appreciate having control over how they distribute inscriptions for their ebooks. For example, a publisher may wish to offer a custom inscription to contest winners (e.g., "Congratulations, you won one of only five custom-inscribed copies of *If on a Winter's Night a Traveler*").

FIG. 4 illustrates a logical view of one embodiment of the inscription management subsystem 130. In the embodiment shown, the inscription management subsystem 130 includes a related books module 410, an inscription unlock module 420, and an inscription push module 430. Other embodiments of the inscription management subsystem 130 may include different and/or additional components. In addition, the functions provided may be distributed among components in a different manner than described herein. For example, although the illustrated inscription management subsystem 130 provides functions for use by both users and content providers, in one embodiment the functions available to users and content providers are provided by different subsystems.

The related books module 410 enables a user to view an inscription in a plurality of related ebooks. Examples of ebooks that can be considered related include (but are not limited to): different copies of a particular ebook, a plurality of ebooks from a particular series (e.g., the Discworld series), a plurality of ebooks by a particular author, and a plurality of books purchased at substantially the same time (e.g., all ebooks purchased at a particular in-store event).

In one embodiment, when the inscription module 250 adds an inscription to a user's copy of an ebook, a copy of the inscription is stored in the system database 150 as part of the inscription data 350 along with metadata identifying the ebook, the position of the inscription, and the identity of the user for which the inscription was created. If the user later downloads a second copy of the identified ebook to a user computer 180A (e.g., if the user accidentally deletes the original copy or purchases a new ereader device), the related books module 410 identifies that there is an inscription stored in the system database 150 corresponding to the user and ebook and sends a copy of the inscription to the user computer 180A.

In another embodiment, the related books module 410 makes an inscription originally added to one ebook available in one or more related ebooks in the same series and/or by the same author that the user owns. The related books module 410 provides a user interface with which the user can select a location within the related ebooks to which the inscription should correspond. For example, when the user first opens such an ebook after an inscription has been created, the user is informed that the inscription is available to be added and prompted to select a location for the inscription. The related books module 410 then stores the selected location is then stored in the inscription data 350 in association with the inscription. Alternatively, the related books module 410 may automatically add inscriptions in an area of whitespace in the related books, such as the area of adequate whitespace nearest to the start of the ebook.

The inscription unlock module 420 unlocks access to inscriptions for particular users responsive to data provided by those users. For example, a custom inscription could be provided to the first ten users who provide the correct answer to a trivia question posted on the author's website. As another example, an inscription including a photograph of the user with the author from an in-store signing could be unlocked by the user entering a custom code provided at the in-store signing.

In one embodiment, a content provider provides the inscription module 250 with an inscription and one or more unlock conditions that a user must meet in order to access the inscription. The unlock conditions can include data the user must provide, such as a response to a question, photograph of a particular object, and the like. The unlock conditions can also include restraints on which users can unlock the inscription, such as limiting unlocking to a fixed number of users (e.g., the first five to meet the other unlock conditions) and/or only allowing users in a predetermined geographic area to unlock the inscription. The inscription module 250 stores the inscription and the corresponding unlock conditions in the inscription data 350. The content provider typically advertises the availability of the inscription (e.g., on a website) and provides clues regarding what is required to unlock the inscription, such as one or more questions.

In order to unlock the inscription, a user sends data from a user computer 180A to the inscription unlock module 420 that the user believes proves that the user meets the unlock conditions. The inscription unlock module 420 compares the received data to the unlock conditions stored in the inscription data 350. If the received data indicates that the user meets the unlock conditions, the inscription unlock module 420 sends the inscription to the user computer 180A. The inscription unlock module 420 may also add metadata to the inscription data 350 indicating that the user has unlocked the inscription.

In another embodiment, an unlockable inscription and the corresponding unlock conditions are sent to a user computer 180A at the same time as the corresponding ebook. However, the inscription is not displayed to the user until the user meets the unlock conditions. For example, a publisher may run an alternate reality game to promote the release of an ebook and include an inscription providing information about the game that is not unlocked until the user has completed certain other tasks from the game (e.g., visiting a certain location, taking a picture of a particular object, answering a set of questions, and the like).

The inscription push module 430 enables a content provider to send inscriptions to user computers 180A for display without the user computer requesting the inscription. In one embodiment, a content provider identifies an inscription and provides the inscription push module 430 with a list of users. The inscription push module 430 then provides the identified inscription for display to each user on the list. For example, an author may conduct a video chat session (e.g., a GOOGLE+ HANGOUT™) with fans to celebrate the release of a new book and provide an inscription commemorating the event to each fan that participated. During the video chat session, the author creates an inscription as described above with reference to the inscription module 250 of FIG. 2 and sends a request to the inscription push module 430 to provide the inscription to every user present in the video chat.

Computing Machine Architecture

Figure 5:
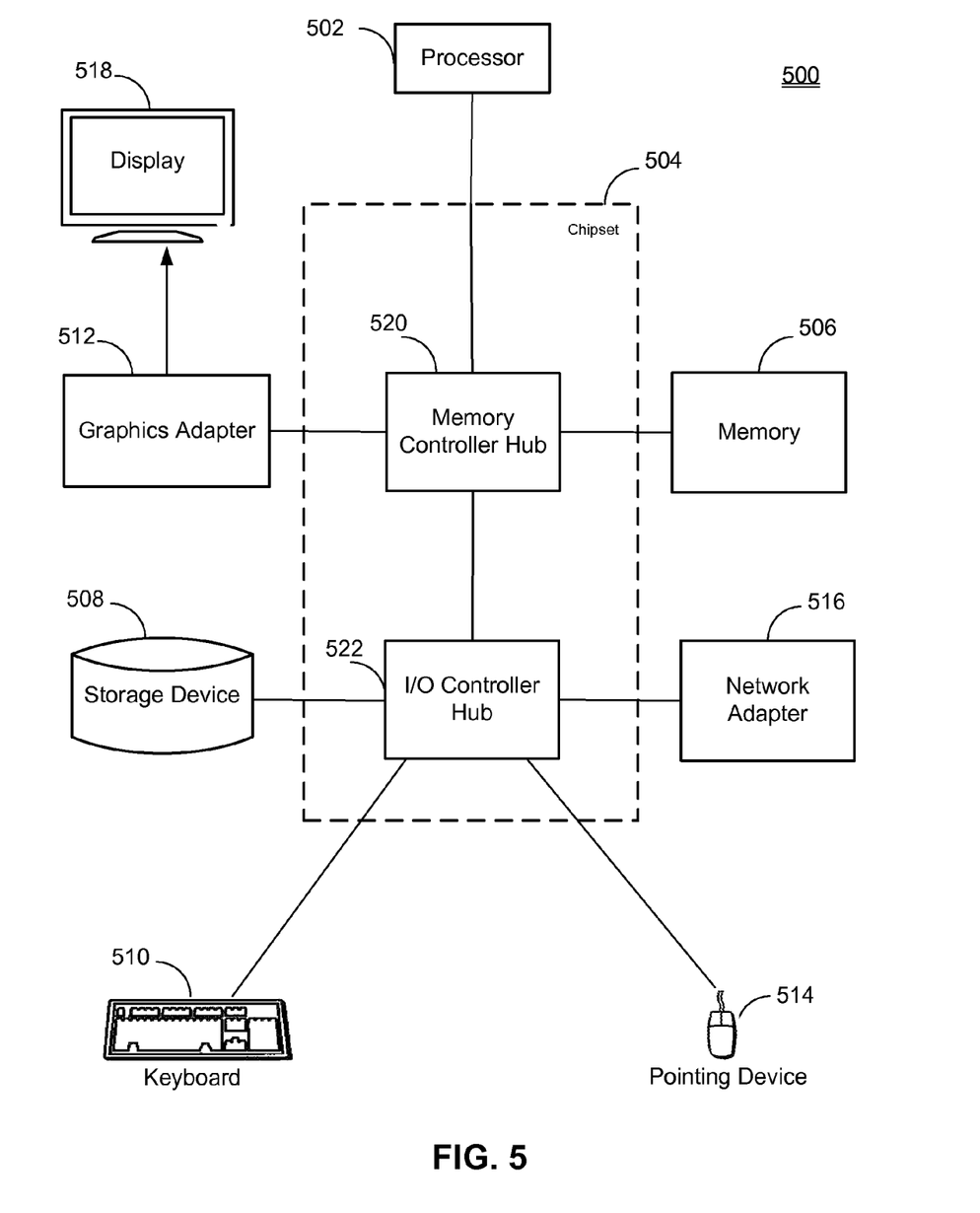
FIG. 5 illustrates a computer suitable for use as a user computer, a content provider computer, or at least part of the cloud provider facility shown in FIG. 1, according to one embodiment.

The entities shown in FIGS. 1-4 are implemented using one or more computers. FIG. 5 is a high-level block diagram illustrating an example computer 500. The computer 500 includes at least one processor 502 coupled to a chipset 504. The chipset 504 includes a memory controller hub 520 and an input/output (I/O) controller hub 522. A memory 506 and a graphics adapter 512 are coupled to the memory controller hub 520, and a display 518 is coupled to the graphics adapter 512. A storage device 508, keyboard 510, pointing device 514, and network adapter 516 are coupled to the I/O controller hub 522. Other embodiments of the computer 500 have different architectures.

The storage device 508 is a non-transitory computer-readable storage medium such as a hard drive, compact disk read-only memory (CD-ROM), DVD, or a solid-state memory device. The memory 506 holds instructions and data used by the processor 502. The pointing device 514 is a mouse, track ball, or other type of pointing device, and is used in combination with the keyboard 510 to input data into the computer system 500. The graphics adapter 512 displays images and other information on the display 518. The network adapter 516 couples the computer system 500 to one or more computer networks, such as network 170.

The computer 500 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 508, loaded into the memory 506, and executed by the processor 502.

The types of computers used by the entities of FIGS. 1-4 can vary depending upon the embodiment and the processing power required by the entity. For example, the cloud provider facility 110 might comprise multiple servers working together to provide the functionality described herein, whereas user computer 180A might be a tablet computing device with content provider computer 180B being a desktop computer. The computers can lack some of the components described above, such as keyboards 510, graphics adapters 512, and displays 518.

Exemplary Method

Figure 6:
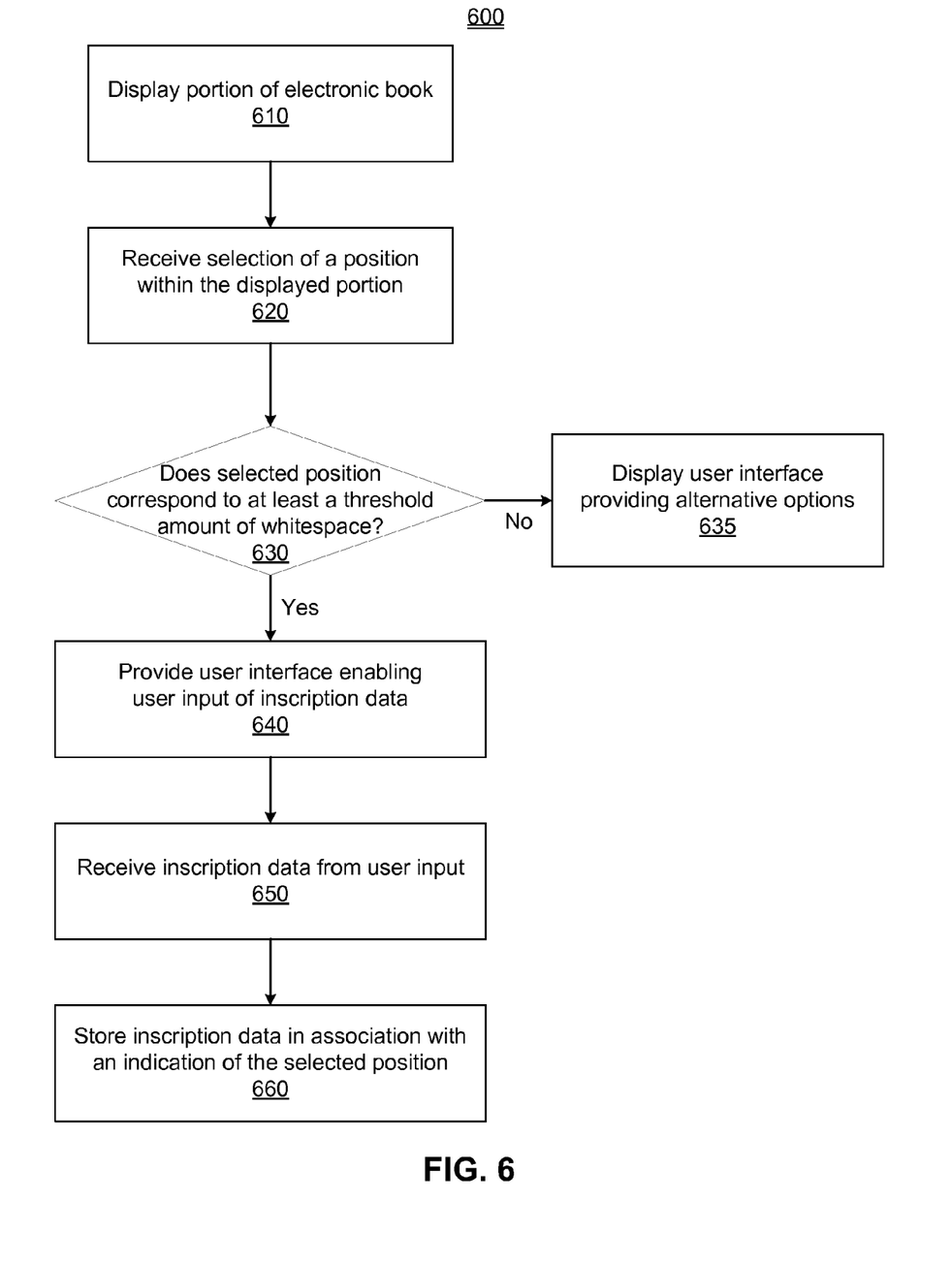
FIG. 6 is a flow chart illustrating a method for inscribing an ebook, according to one embodiment.

FIG. 6 is a flow chart illustrating a method 600 for inscribing an ebook, according to one embodiment. FIG. 6 attributes the steps of the method 600 to the reader module 181 and components thereof. However, some or all of the steps may be performed by other entities. In addition, some embodiments may perform the steps in parallel, perform the steps in different orders or perform different steps.

The method 600 begins with the display module 220 displaying 610 a portion of an ebook. As described previously, the ebook may be stored locally or may be obtained from the cloud provider facility 110 on demand. The inscription module 250 then receives 620 a selection of a position within the displayed portion of the ebook. In one embodiment, the selected position is received 620 from the user input module 240 in response to a reader pressing and holding on the display of a user computer 180 at a point corresponding to the selected position. For example, if the first page of the book contains the title and author's name, surrounded by a large amount of whitespace, a reader at an in-store signing session may press and hold in an area of whitespace below the author's name in order to have the author sign the book in that position. In other embodiments, the selected position is received 620 from a remote computing device (e.g., a content provider computer 180B) that is offering to send an inscription to the user computer 180A for addition to one or more ebooks.

The inscription module 250 determines 630 whether the selected position corresponds to at least a threshold amount of whitespace. As described previously the threshold can be pre-determined or set based on user parameters.

If the selected position does not correspond to a sufficient area of whitespace then the display module 220 displays 635 a user interface presenting the reader with one or more alternative options. In one embodiment, the inscription module 250 searches the ebook for the nearest area of whitespace that exceeds the threshold amount and suggests adding an inscription in that position to reader. In another embodiment, the inscription module 250 presents the reader with a list of areas of sufficient whitespace (e.g., in a list, sorted by proximity to the selected position) and prompts the reader to select one in which to add an inscription. In yet another embodiment, the reader is presented with a warning that the selected area of whitespace is not large enough and warned that adding an inscription may obscure underlying ebook content. The reader is then prompted to select whether to proceed with adding an inscription or cancel the request.

If the selected position does correspond to at least the threshold amount of whitespace, the user interface module 240 provides 640 a user interface for obtaining inscription data via user input. As described previously, with reference to FIGS. 2-4, the inscription data can include one or more types of data, including searchable text, freehand text, freehand drawings, photographs, videos, audio recordings, and the like. In one embodiment, the user interface includes an area in which the user (e.g., an author or the reader) can free-draw inscription data (e.g., an autograph) and user controls for adding one or more files, such as photographs, videos, and/or audio recordings.

The inscription module 250 receives 650 the inscription data provided via the user interface provided by the user interface module 240. The inscription module 250 then stores 660 the inscription data in association with an indication of the selected position. In one embodiment, the inscription data, the indication of the selected position, and an indication of the reader's identify (e.g., a user ID) is sent to the cloud provider facility 110 and stored 660 as part of the system database 150. In another embodiment, the inscription data is stored 660 locally and may be uploaded to the system database 150 at a later point in time, such as at the request of the reader or as part of a regular backup procedure.

Once the inscription data and corresponding position in the ebook have been stored 660, the inscription can later be accessed by the reader. In one embodiment, when the reader opens an ebook, the display module 220 automatically checks the system database 150 and/or local storage for inscriptions. If the display module 220 identifies any inscriptions for the current ebook it displays them in conjunction with the ebook at the stored corresponding position. In other embodiments, the display module 220 checks for inscriptions at different times and with different granularity, such as checking for inscriptions corresponding to a specific page when the reader turns to that page.

Additional Considerations

In some embodiments, conventional mechanisms are used to implement many of the aspects of the networked environment 100. For example, the existing mechanisms from Google Inc.'s BOOKS™, GMAIL™, BUZZ™, CHAT™, TALK™, ORKUT™, CHECKOUT™, YOUTUBE™, SCHOLAR™, BLOGS·, GOOGLE+™, HANGOUTS™, and other products include aspects that can help to implement one or more of storage facilities 310-350, subsystems 120 and 130, servers 140 and 145, and modules 220-250. Google Inc. already provides eBook readers for ANDROID™ devices (phones, tablets, etc.), iOS devices (iPhones®, iPads® and other devices from Apple, Inc.) and various desktop Web browsers, and in one embodiment Google Inc.'s EDITIONS™ eBook reader application is modified to provide the functionality described herein.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs executed by a processor, equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

In this description, the term "module" refers to computational logic for providing the specified functionality. A module can be implemented in hardware, firmware, and/or software. Where the modules described herein are implemented as software, the module can be implemented as a standalone program, but can also be implemented through other means, for example as part of a larger program, as a plurality of separate programs, or as one or more statically or dynamically linked libraries. It will be understood that the named modules described herein represent one embodiment of the present invention, and other embodiments may include other modules. In addition, other embodiments may lack modules described herein and/or distribute the described functionality among the modules in a different manner. Additionally, the functionalities attributed to more than one module can be incorporated into a single module. In an embodiment where the modules as implemented by software, they are stored on a computer readable persistent storage device (e.g., hard disk), loaded into the memory, and executed by one or more processors included as part of the cloud provider facility 110. Alternatively, hardware or software modules may be stored elsewhere within the cloud provider facility 110. The cloud provider facility 110 includes hardware elements necessary for the operations described here, including one or more processors, high speed memory, hard disk storage and backup, network interfaces and protocols, input devices for data entry, and output devices for display, printing, or other presentations of data.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for providing ebook inscriptions through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for inscribing an electronic book, comprising:
    displaying a portion of the electronic book on a display of a local computing device;
    receiving a selection of a position within the portion;
    displaying a user interface for providing inscription data responsive to determining that the position corresponds to greater than a threshold amount of whitespace;
    receiving the inscription data responsive to user input; and
    storing the inscription data in association with an indication of the position.

2. The computer-implemented method of claim 1, further comprising:
    analyzing electronic book content at the position to determine an amount of whitespace, wherein the position corresponds to greater than the threshold amount of whitespace responsive to the determined amount being greater than the threshold amount.

3. The computer-implemented method of claim 2, wherein the analyzing comprises:
    determining a largest rectangle that encompasses the position that can be placed without encompassing any electronic book content other than whitespace; and
    calculating an area of the rectangle, the determined amount of whitespace being the area.

4. The computer-implemented method of claim 1, wherein the storing comprises:
    transmitting the inscription data and the indication of the position to a remote computing device.

5. The computer-implemented method of claim 1, wherein the storing comprises:
    transmitting the inscription data and the indication of the position to a plurality of remote computing devices, wherein the plurality of remote computing devices are connected to the local computing device using an online chat interface.

6. The computer-implemented method of claim 1, wherein the inscription data includes at least one of: typed text, freehand text, an image, a video, or an audio recording.

7. The computer-implemented method of claim 1, further comprising:
    identifying a second electronic book that is related to the electronic book;
    identifying an area in the second electronic book, an amount of whitespace corresponding to the area being greater than the threshold amount of whitespace; and
    storing the inscription data in association with an indication of a position corresponding to the area.

8. The computer-implemented method of claim 1, wherein receiving the selection of the position comprises:
  receiving data describing user input; and
  identifying, from the data, a user pressing and holding at a point of contact on the display, the position corresponding to the point of contact.

9. A computer system for inscribing an electronic book, comprising:
  a non-transitory computer-readable storage medium comprising executable computer program code for:
    displaying a portion of the electronic book on a display of a local computing device;
    receiving a selection of a position within the portion;
    displaying a user interface for providing inscription data responsive to determining that the position corresponds to greater than a threshold amount of whitespace;
    receiving the inscription data responsive to user input; and
    storing the inscription data in association with an indication of the position; and
  a processor for executing the computer program code.

10. The computer system of claim 9, wherein the non-transitory computer-readable storage medium further comprises computer program code for:
  analyzing electronic book content at the position to determine an amount of whitespace, wherein the position corresponds to greater than the threshold amount of whitespace responsive to the determined amount being greater than the threshold amount.

11. The computer system of claim 10, wherein the analyzing comprises:
  determining a largest rectangle that encompasses the position that can be placed without encompassing any electronic book content other than whitespace; and
  calculating an area of the rectangle, the determined amount of whitespace being the area.

12. The computer system of claim 9, wherein the storing comprises:
  transmitting the inscription data and the indication of the position to a remote computing device.

13. The computer system of claim 9, wherein the storing comprises:
  transmitting the inscription data and the indication of the position to a plurality of remote computing devices, wherein the plurality of remote computing devices are connected to the local computing device using an online chat interface.

14. The computer system of claim 9, wherein the inscription data includes at least one of: typed text, freehand text, an image, a video, or an audio recording.

15. The computer system of claim 9, wherein the non-transitory computer-readable storage medium further comprises computer program code for:
  identifying a second electronic book that is related to the electronic book;
  identifying an area in the second electronic book, an amount of whitespace corresponding to the area being greater than the threshold amount of whitespace; and
  storing the inscription data in association with an indication of a position corresponding to the area.

16. The computer system of claim 9, wherein receiving the selection of the position comprises:
  receiving data describing user input; and
  identifying, from the data, a user pressing and holding at a point of contact on the display, the position corresponding to the point of contact.

17. A non-transitory computer-readable storage medium storing executable computer program instructions for inscribing an electronic book, the computer program instructions comprising instructions for:
  displaying a portion of the electronic book on a display of a local computing device;
  receiving a selection of a position within the portion;
  displaying a user interface for providing inscription data responsive to determining that the position corresponds to greater than a threshold amount of whitespace;
  receiving the inscription data responsive to user input; and
  storing the inscription data in association with an indication of the position.

18. The non-transitory computer-readable storage medium of claim 17, wherein the computer program instructions further comprise instructions for:
  analyzing electronic book content at the position to determine an amount of whitespace, wherein the position corresponds to greater than the threshold amount of whitespace responsive to the determined amount being greater than the threshold amount.

19. The non-transitory computer-readable storage medium of claim 18, wherein the analyzing comprises:
  determining a largest rectangle that encompasses the position that can be placed without encompassing any electronic book content other than whitespace; and
  calculating an area of the rectangle, the determined amount of whitespace being the area.

20. The non-transitory computer-readable storage medium of claim 17, wherein the storing comprises:
  transmitting the inscription data and the indication of the position to a remote computing device.

21. The non-transitory computer-readable storage medium of claim 17, wherein the storing comprises:
  transmitting the inscription data and the indication of the position to a plurality of remote computing devices, wherein the plurality of remote computing devices are connected to the local computing device using an online chat interface.

22. The non-transitory computer-readable storage medium of claim 17, wherein the inscription data includes at least one of: typed text, freehand text, an image, a video, or an audio recording.

23. The non-transitory computer-readable storage medium of claim 17, wherein the computer program instructions further comprise instructions for:
  identifying a second electronic book that is related to the electronic book;
  identifying an area in the second electronic book, an amount of whitespace corresponding to the area being greater than the threshold amount of whitespace; and
  storing the inscription data in association with an indication of a position corresponding to the area.

24. The non-transitory computer-readable storage medium of claim 17, wherein receiving the selection of the position comprises:
  receiving data describing user input; and
  identifying, from the data, a user pressing and holding at a point of contact on the display, the position corresponding to the point of contact.

* * * * *